United States Patent
Erkelenz

(10) Patent No.: US 11,365,514 B2
(45) Date of Patent: Jun. 21, 2022

(54) SEALING STRIP SYSTEM AND SEALING STRIP

(71) Applicant: VOITH PATENT GMBH, Heidenheim (DE)

(72) Inventor: Marc Erkelenz, Neu-Ulm (DE)

(73) Assignee: Voith Patent GmbH, Heidenheim (DE)

(*) Notice: Subject to any disclaimer, the term of this patent is extended or adjusted under 35 U.S.C. 154(b) by 0 days.

(21) Appl. No.: 16/971,541

(22) PCT Filed: Jan. 29, 2019

(86) PCT No.: PCT/EP2019/052030
§ 371 (c)(1),
(2) Date: Aug. 20, 2020

(87) PCT Pub. No.: WO2019/170321
PCT Pub. Date: Sep. 12, 2019

(65) Prior Publication Data
US 2021/0087747 A1    Mar. 25, 2021

(30) Foreign Application Priority Data
Mar. 8, 2018 (DE) .............. 102018105313

(51) Int. Cl.
*D21F 3/10* (2006.01)
*D21F 7/00* (2006.01)
(Continued)

(52) U.S. Cl.
CPC .............. *D21F 3/10* (2013.01); *D21F 7/00* (2013.01); *F16J 15/3296* (2013.01); *D21F 1/50* (2013.01)

(58) Field of Classification Search
CPC ...... D21F 3/10; D21F 7/00; D21F 1/50; F16J 15/3296
See application file for complete search history.

(56) References Cited

U.S. PATENT DOCUMENTS 9,447,542 B2    9/2016  Erkelenz et al.
10,713,454 B2   7/2020  Gommeringer et al.
(Continued)

FOREIGN PATENT DOCUMENTS

DE  102012208811 B3    7/2013
DE  102012208795 A1 * 11/2013 ............... D21F 3/10
(Continued)

*Primary Examiner* — Eric Hug
*Assistant Examiner* — Matthew M Eslami
(74) *Attorney, Agent, or Firm* — Laurence A. Greenberg; Werner H. Stemer; Ralph E. Locher

(57) ABSTRACT

A sealing strip for sealing a suction zone of a suctioned roll of a machine for producing and/or processing a fibrous web has wear volume, which is gradually worn away by tribological contact with the roll. The sealing strip system further includes a sensor system for detecting the state of wear of the sealing strip, and an evaluation unit. The sensor system is embedded in a sensor channel extending within the sealing strip in the longitudinal direction at the wear volume across substantially the entire length of a sealing surface of strip, and is connectable to the evaluation unit and/or to a unit for supplying the sensor system with a medium for generating information via a connection provided on the lower side of the sealing strip, and leading out of the strip on the side of the wear volume facing away from the sealing surface.

16 Claims, 6 Drawing Sheets

(51) Int. Cl.
*F16J 15/3296* (2016.01)
*D21F 1/50* (2006.01)

(56) References Cited

U.S. PATENT DOCUMENTS

2005/0126732 A1   6/2005  Gleason, Jr.
2015/0184340 A1*  7/2015  Erkelenz .................. D21F 1/50
                                                              162/374

FOREIGN PATENT DOCUMENTS

DE     102012208795 A1   11/2013
DE     102015207383 A1   10/2016
DE     202017104513 U1    9/2017

* cited by examiner

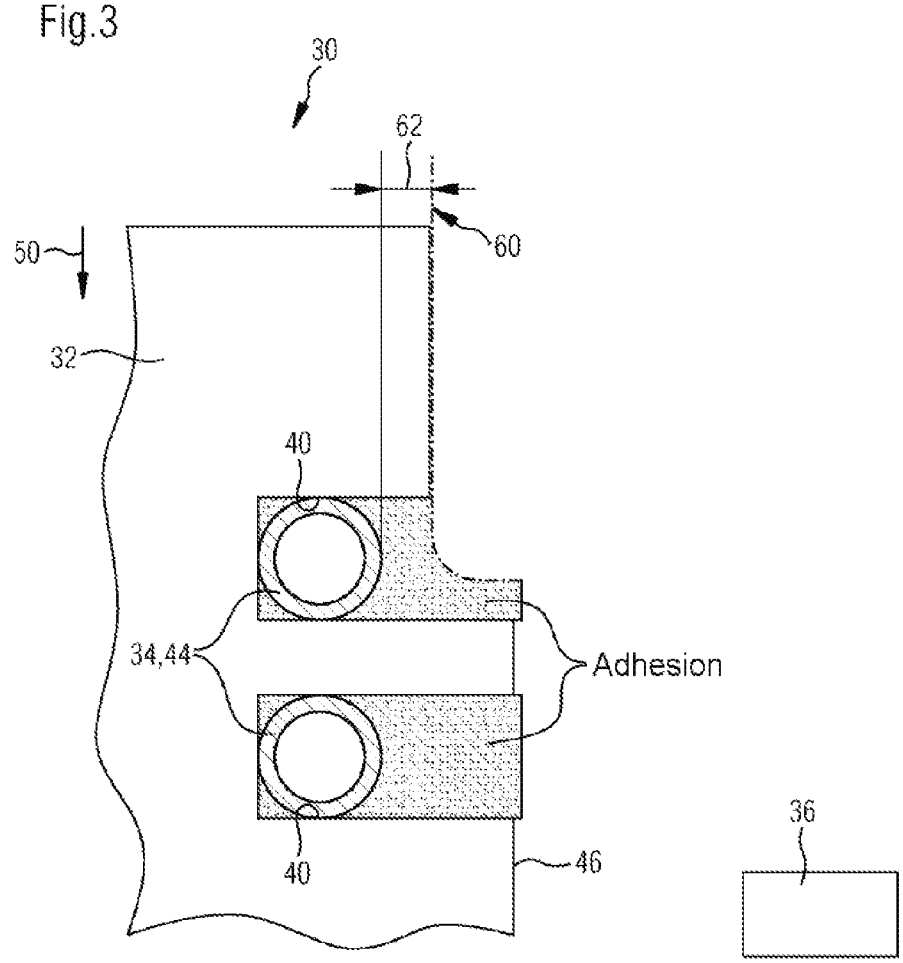

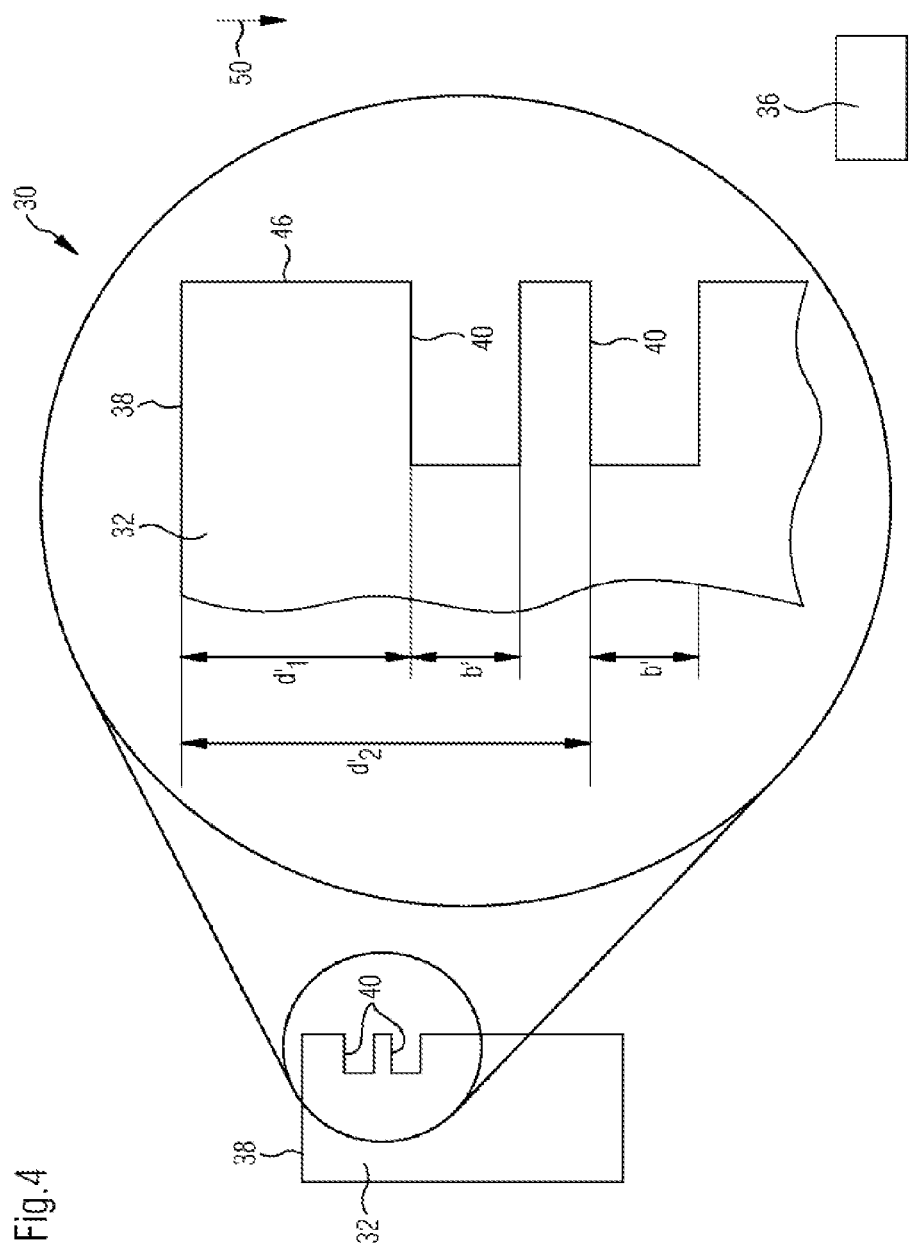

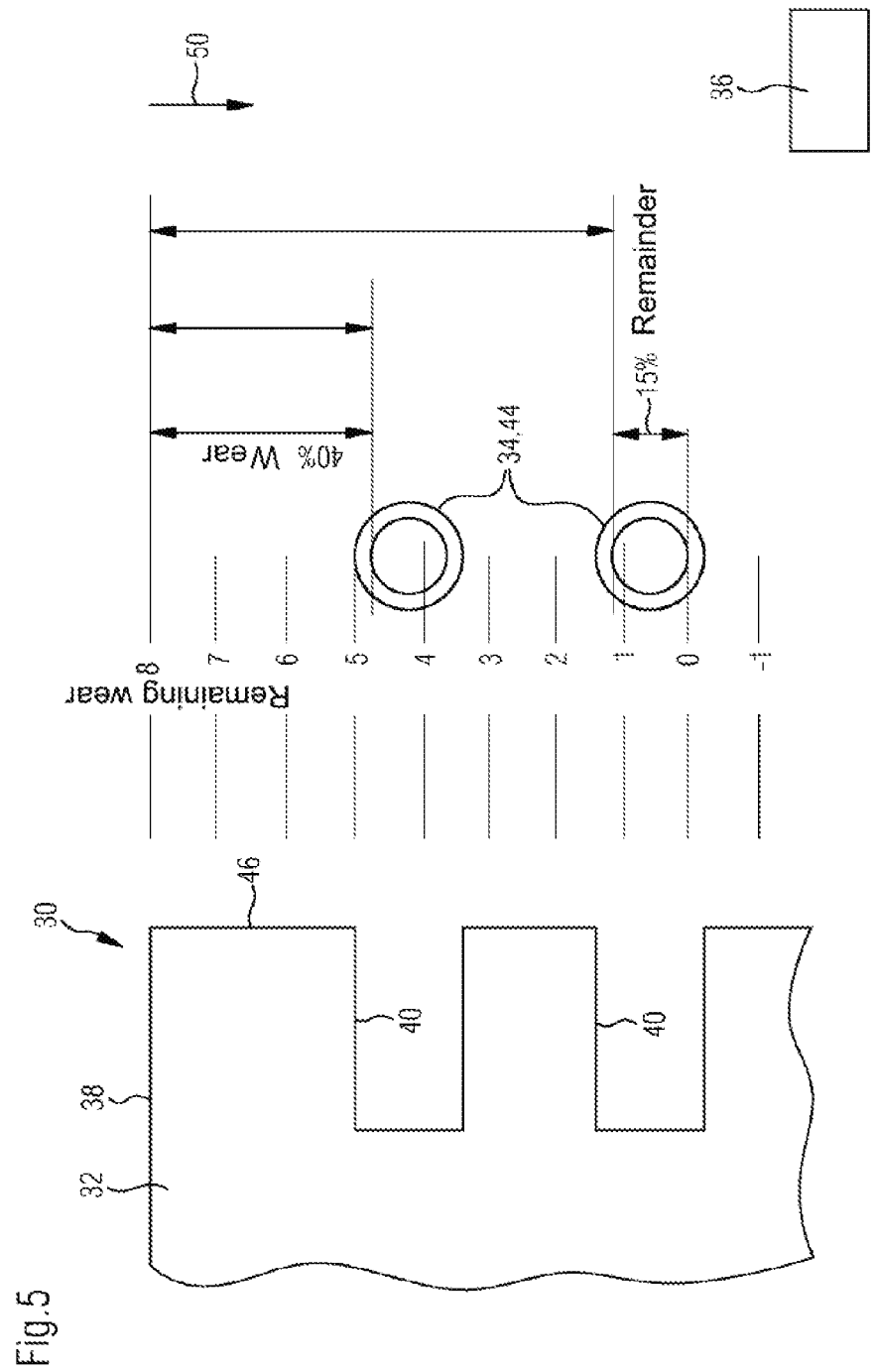

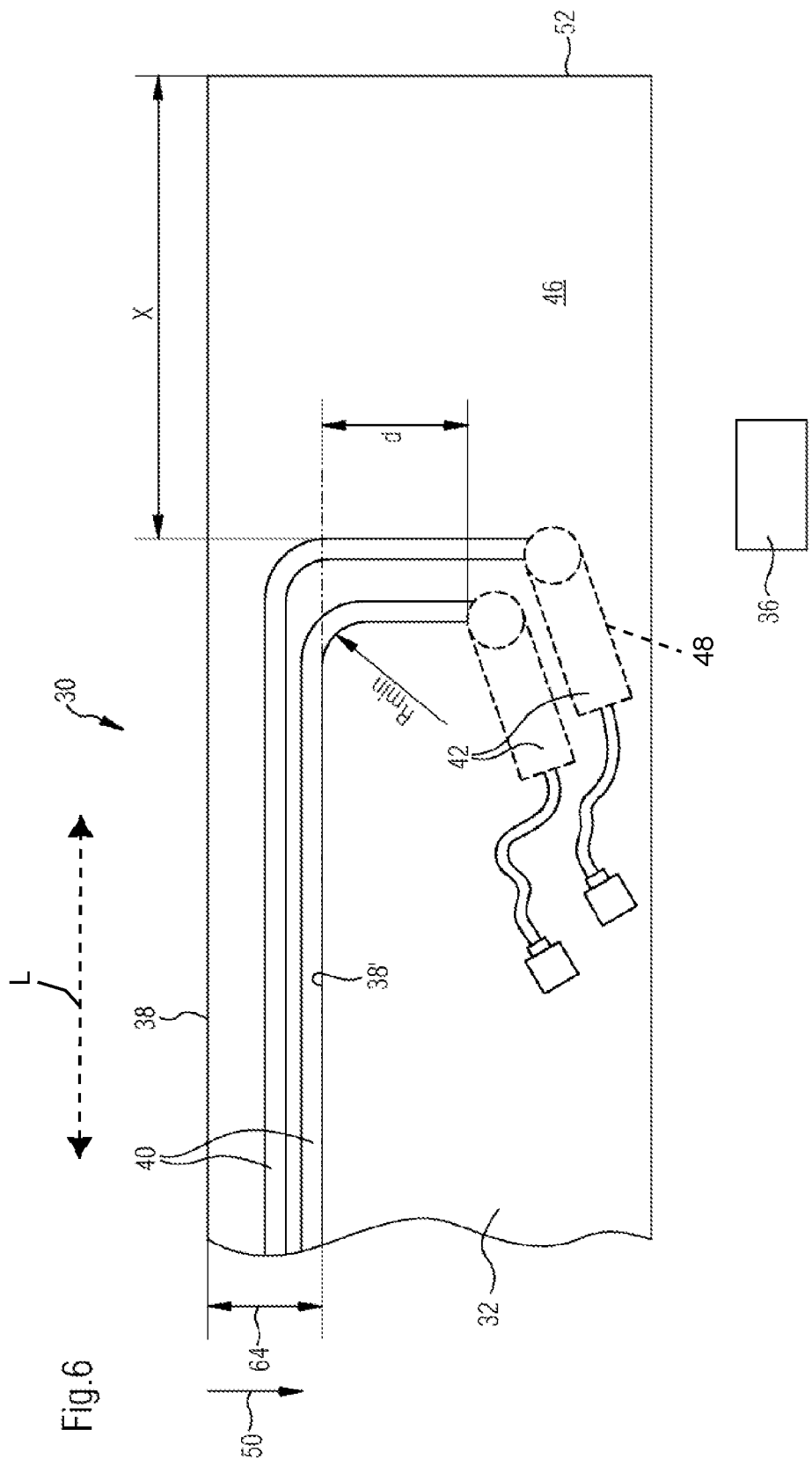

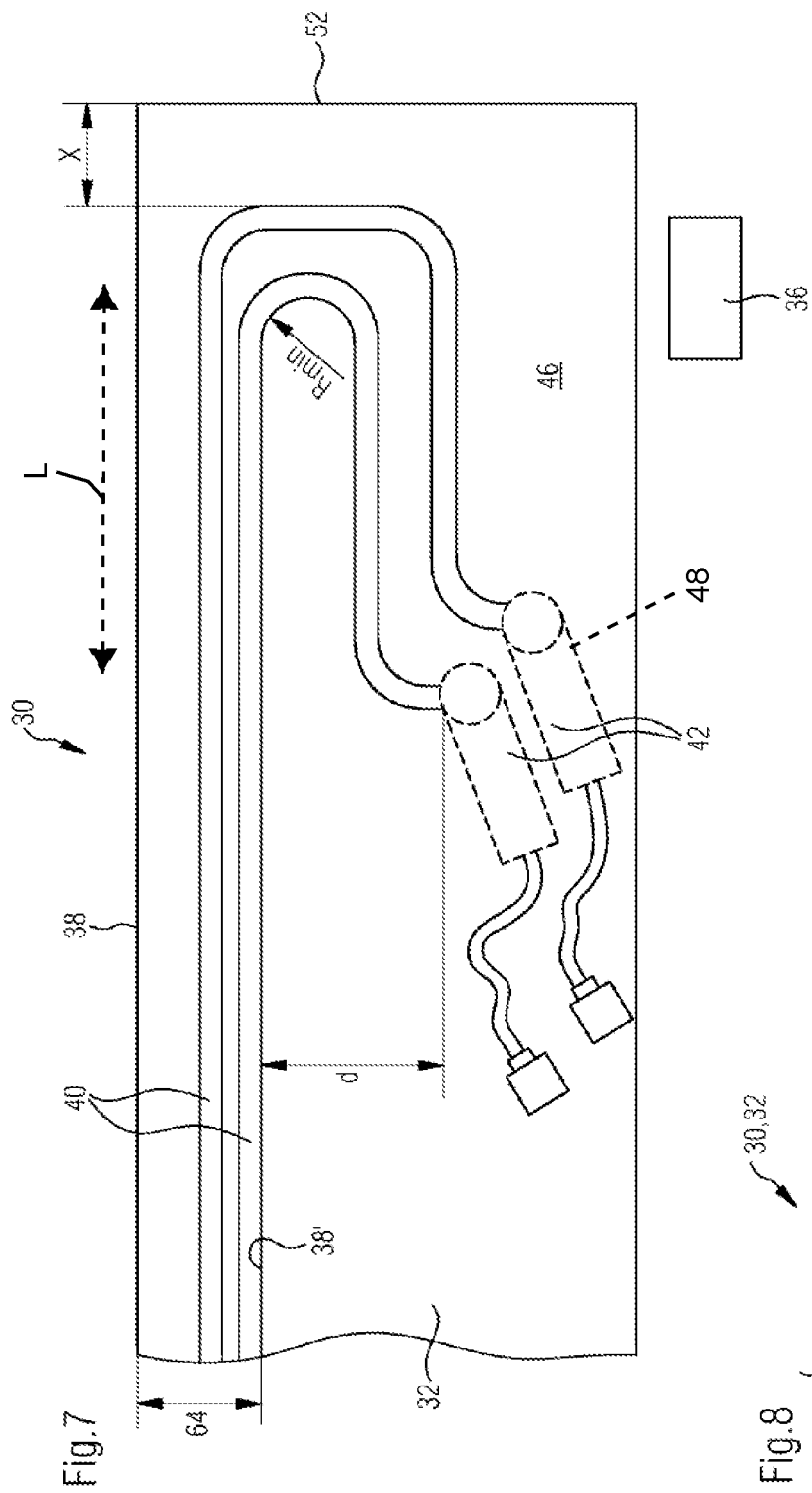
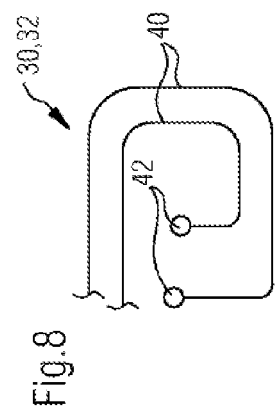

SEALING STRIP SYSTEM AND SEALING STRIP

BACKGROUND OF THE INVENTION

Field of the Invention

The invention relates to a sealing strip system having at least one sealing strip for sealing a suction zone of a suctioned roll of a machine for producing and/or processing a web of fibrous material and a sealing strip for such a sealing strip system.

In paper machines, sealing strips are required in suctioned rolls which have one or more vacuum zones in order to maintain the vacuum. In this case, during the sealing procedure, the sealing strips are subject to a certain degree of wear since they are pressed against the rotating roll jacket of the roll.

If the sealing strips are fully or even only partially abraded in excess of the maximum wear measurement, this can lead to a break in the vacuum and therefore to problems with the operation of the paper machine. In the worst case, the paper machine has to undergo an unscheduled shutdown to change the roll.

Suction rolls are therefore usually changed preemptively and then systematically restored in order to replace the sealing strips preemptively, generally long before the maximum wear potential is reached. Sealing strip wear is, in many cases, the main reason for changing the rolls. In rarer cases, suction rolls are also changed for other reasons, for example failure of bearings or excessive clogging of suction bores.

In the course of the current technical development (Industry 4.0), attempts are also being made in the paper and pulp industry to provide individual components with greater intelligence. In this regard, for example, attempts have been made to install additional sensor technology in rolls, in particular also in or on suctioned rolls.

In the case of a suctioned roll, at least one negative pressure zone, which has to be sealed with respect to the environment, is located in the interior so that water can be sucked from the web of fibrous material and/or the covering through the perforated roll jacket and also in order to guide the paper web. The strips which are pressed against the rotating roll jacket from the inside for sealing purposes become worn despite the lubrication which is conventionally performed over the operating period. When a certain level of wear is reached, they have to be replaced. However, since the state of wear of the strips cannot be readily detected from the outside, sensors which can display the state of wear are desirable. To this end, corresponding sealing strip systems have also already become known. However, these are at least somewhat unsatisfactory. In this regard, tests have shown that, amongst other things, it is disadvantageous if the sensor system is embedded in the respective sealing strip via a milled groove extending in the direction of the axis of the expected wear. In this case, imprecise, wavy embedding of the sensor system over the longitudinal extent of the sealing strip can occur. Even the smallest displacements of the sensor system can therefore lead to considerable errors in the derivation of the result for determining the wear. Moreover, this type of embedding can also lead to the risk of a defect in the sealing strip. In this regard, the sealing strip, which is in any case thin or narrow in some circumstances based on the construction, is further weakened along the axis of the wear through splitting due to the groove which is perpendicular to the longitudinal direction of the sealing strip, whereby the sealing strip, due to the friction forces generated by the roll, can fracture transversely to the groove, which would result in failure of the sealing strip and unscheduled shutdown of the machine.

SUMMARY OF THE INVENTION

The invention is therefore based on the object of specifying a sealing strip system of the type mentioned at the outset, in which the above-mentioned disadvantages are eliminated. In this case, the aim, in particular, is to ensure a monitoring of the respective state of wear which is as precise and reproducible as possible over the length of the sealing strip. Moreover, the aim is also to ensure that, by connecting the sensor system associated with the sealing strip to an evaluation unit, a unit for supplying the sensor system with the relevant medium serving to generate information and/or the like, defects do not occur in the sealing strip, let alone in the roll.

According to the invention, this object is achieved by a sealing strip system as claimed. Preferred embodiments of the inventive sealing strip system are revealed in the sub-claims, the present description and the drawing.

The inventive sealing strip system comprises at least one sealing strip for sealing a suction zone of a suctioned roll of a machine for producing and/or processing a web of fibrous material, wherein the sealing strip has a wear volume, which is gradually abraded by tribological contact with the roll. The inventive sealing strip system moreover comprises a sensor system for detecting the respective state of wear of the sealing strip and an evaluation unit which can be connected to the sensor system. In this case, the sensor system is embedded according to the invention in at least one sensor channel extending at least partially within the sealing strip or on the sealing strip in the longitudinal direction thereof in the region of the wear volume over at least substantially the entire length of the sealing face of the sealing strip and can be connected to the evaluation unit and/or a unit for supplying the sensor system with a medium serving to generate information via at least one connection which leads out of the sealing strip via the lower region of the sealing strip provided on the side of the wear volume which faces away from the sealing face.

As a result of this configuration, it is not only ensured that the respective state of wear is monitored as precisely and reproducibly as possible over the length of the sealing strip. It is also ensured that, by connecting the sensor system associated with the sealing strip to an evaluation unit, a unit for supplying the sensor system with the relevant medium serving to generate information and/or the like, defects do not occur in the sealing strip, let alone in the roll.

In this case, the term "sensor channel" can have a very broad meaning within the scope of this invention. In this regard, it shall not only be understood to be such a channel in which the sensor system extends fully within the interior of the sealing strip or in a recess of the sealing strip. The term shall also comprise such embodiments in which only parts of the sensor system extend in a recess of the sealing strip, whilst further parts extend outside the sealing strip. Within the scope of this application, however, the sensor channel can also be provided on the sealing strip. A sensor channel can be constructed in the form of a hose, for example, which is provided externally on the sealing strip and which receives the sensor system.

According to a preferred practical embodiment of the inventive sealing strip system, a respective sensor channel is incorporated in the sealing strip by straight milling, in particular in the form of a groove.

The sensor system is fixed in the at least one sensor channel by an adhesive and/or with form fit, force fit and/or material fit.

According to an advantageous practical embodiment of the inventive sealing strip system, at least one sensor channel is incorporated in the sealing strip from an end side of the sealing strip.

However, at least one sensor channel can advantageously also be incorporated in the sealing strip from a longitudinal side, in particular from the side of the sealing strip which faces the suction zone.

However, alternatively or additionally, at least one sensor channel can also be incorporated in the sealing strip from the back or rear side facing away from the suction zone or from the front side of the sealing strip.

At least one sensor channel is preferably arranged at the level of a predetermined wear point in the sealing strip. As soon as the predetermined wear point is reached, the sensor arranged in the relevant sealing strip responds. It can then be decided whether to already replace the sealing strip or to wait until a further wear point is reached which is likewise monitored as required by the sensor system.

According to a preferred practical embodiment of the inventive sealing strip system, the sealing strip is provided with at least two sensor channels arranged at different spacings from the sealing face and each extending within the sealing strip in the longitudinal direction thereof in the region of the wear volume over at least substantially the entire length of the sealing face of the sealing strip.

Since a plurality of such sensor channels are provided, which are arranged at different spacings from the sealing face, the state of wear of the sealing strip can be monitored more precisely over the course of its operating period so that it is possible to wait until shortly before the maximum wear is reached to replace the sealing strip.

The sensor system can comprise, for example, at least one wire, conductor and/or light guide extending in a respective sensor channel. In this case, the medium serving to generate information can comprise, in particular, power and/or light.

According to a further advantageous embodiment of the inventive sealing strip system, the medium serving to generate information can also comprise a gas and/or fluid guided in a respective sensor channel or a tube, hose or the like arranged therein.

If the wear on the sealing strip has advanced as far as a respective sensor channel, this can result, in particular, in a break in the relevant wire, conductor, light guide and/or the like or in damage to the tube, hose or the like so that it is possible to establish via a break in the power or the light, via the exit of gas, fluid and/or the like that the wear on the sealing strip has continued as far as the relevant sensor channel.

It is likewise possible that contact is initially established or triggered via the exposure of the sensor (e.g. contact with the metal roll jacket which signals the wear).

According to a preferred embodiment of the inventive sealing strip system, the at least one connection of the sensor system to the evaluation unit and/or the unit for supplying the sensor system with a medium serving to generate information leads out of the sealing strip via the lower region of the sealing strip provided on the side of the wear volume which faces away from the sealing face. It is thus ensured that defects do not occur in the sealing strip, let alone in the roll, even with increasing wear on the sealing strip in the region of the connection of the sensor system to the evaluation unit and/or a unit for supplying the sensor system with a medium serving to generate information.

In this case, the at least one connection of the sensor system to the evaluation unit and/or the unit for supplying the sensor system with a medium serving to generate information can advantageously lead out of the sealing strip from a longitudinal side of the sealing strip via the lower region of the sealing strip provided on the side of the wear volume which faces away from the sealing side.

This can advantageously be the side of the sealing strip which faces the suction zone. The connections can thus be guided in the interior of the suction zone of the roll. Further supply lines are frequently guided there, for example compressed air lines for pressure hoses of the strips or the like, with which the connections can be joined simply and expediently. Moreover, the connections can therefore also simply lead out of the roll at an end side of the roll.

However, it can also be provided that, in one or in all sealing strips, a connection leads out of the sealing strip from a back or rear side of the sealing strip, which faces away from the suction zone.

The connection of the sensor system to the evaluation unit and/or the unit for supplying the sensor system with a medium serving to generate information expediently comprises at least one gas, fluid, power and/or light line and/or at least one gas, fluid, power and/or light connection.

The connection of the sensor system to the evaluation unit and/or the unit for supplying the sensor system with a medium serving to generate information can, for example, also comprise at least one kink protection, in particular such as at least one elbow or the like.

A protective device can likewise be mounted on the sealing strip or on the sealing strip holder or the suction box, which protective device protects the sensor line outside the sealing strip against damage which can be caused, for example, by the vacuum flow, water or an accumulation of fibrous material or clumps or other contaminants in the suctioned roll.

The connection of the sensor system to the evaluation unit and/or the unit for supplying the sensor system with a medium serving to generate information preferably leads out of the sealing strip in a region which, as seen in the direction of the axis of the expected wear, has a predetermined minimum safety spacing from the maximally worn sealing face of the sealing strip and/or, as seen in the longitudinal direction of the sealing strip from a respective end side of the sealing strip, has a spacing which depends on the adjustment path of a format limiter sealing the suction zone in the region of this end side.

The format limiter of a suctioned roll is displaceable in order to be adapted to the actual width of the paper web. If the sensor for monitoring the wear leads out of the sealing strip on the same side as the format limiter, the sensor has to be guided in the sealing strip to the end of the sealing strip and, from there, back in the sealing strip again to a point at which the format limiter can no longer be displaced. It is thus ensured that the region of the format limiter can also be monitored. It is also advantageous, in particular, if the sealing strip is provided with a recess serving for stroke limitation.

It can furthermore be advantageously provided that the connection of the sensor system to the evaluation unit and/or the unit for supplying the sensor system with a medium serving to generate information leads out of the sealing strip in a region which, as seen in the direction of the axis of the expected wear, has a predetermined minimum safety spacing (d) from the maximally worn sealing face of the sealing strip, and also as seen in the longitudinal direction (L) of the sealing strip from a respective end side (52) of the sealing strip (32), has a spacing (X) which depends on the adjustment path of a format limiter sealing the suction zone in the region of this end side. In this case, the spacing X can advantageously be at least 5 cm, in particular at least 10 cm, preferably at least 15 CM.

In a sealing strip of this type, the leading-out from the strip takes place at one of the longitudinal sides of the sealing strip. In this case, it can be particularly advantageous if the connection of the sensor system to the evaluation unit and/or the unit for supplying the sensor system with a medium serving to generate information leads out of the sealing strip at that longitudinal side which is directed towards a suction zone. The connections can thus simply continue within the suction zone. Existing conventional sealing strip systems can therefore be simply upgraded, since there is usually sufficient space available in the interior of a suction zone for the installation of lines or hoses.

In a further preferred embodiment, it can be provided that the sealing strip has at least two sensor channels, which are each incorporated in the sealing strip from a longitudinal side, in particular from the same longitudinal side, wherein each of the at least two sensor channels is arranged in each case at the level of a predetermined wear point in the sealing strip.

If two, three or more sensor channels are incorporated in the sealing strip, e.g. by milling, this can result in a significant weakening of the sealing strip, which can result in pieces of the strip breaking away during operation. In this case, it is particularly advantageous to incorporate the sensor channels in the sealing strip from a longitudinal side and not from the sealing face, as in the prior art.

In particularly preferred embodiments, the connections to/from the sensors can lead out of the sealing strip on the same longitudinal side. Moreover, a design with the line guide in the interior of the strip allows for greater freedom. In this regard, for example, an embodiment as is shown under FIG. 7 is very difficult to realize.

In terms of the sealing strip, the object is achieved by a sealing strip for a sealing strip system according to an aspect of the invention.

Such a sealing strip has a wear volume which can be gradually abraded by tribological contact with a rotating roll, and a sensor system for detecting the respective state of wear of the sealing strip. The sensor system is embedded in at least one sensor channel extending at least partially within the sealing strip or on the sealing strip in the longitudinal direction (L) thereof in the region of the wear volume over at least substantially the entire length of the sealing face of the sealing strip. Over at least one lower region of the sealing strip, which is provided over the side of the wear volume which faces away from the sealing face, means are provided in order to connect the sensor system in or on the sealing strip to an evaluation unit (36) and/or a unit for supplying the sensor system with a medium serving to generate information The advantageous embodiments of this sealing strip are described mutatis mutandis by the dependent claims of the sealing strip system.

In addition to the described sensor system, the sealing strip system or the sealing strip can also have further functional elements.

Therefore, in particularly advantageous embodiments, it can also be provided that the sealing strip comprises means for transporting a lubricating fluid. Such means can comprise, for example a lubricant supply line provided in or on the strip.

Alternatively or additionally, such a sealing strip or the sealing strip system can comprise a lubricant channel, which is advantageously connected, or can be advantageously connected, to a supply line and which is designed such that, when the lubricant channel is filled with lubricating fluid—e.g. water—during operation of the sealing strip system, lubricant can be brought between the rotating roll and the sealing face of the sealing strip. In this case, such a lubricating channel can be provided in or on the sealing strip (e.g. via a depression in the sealing face). However, it can also be provided at another point of the sealing strip system.

BRIEF DESCRIPTION OF THE SEVERAL VIEWS OF THE DRAWING

The invention is explained in more detail below with the aid of exemplary embodiments with reference to the drawing, which shows.

DETAILED DESCRIPTION OF THE INVENTION

Figure 1:
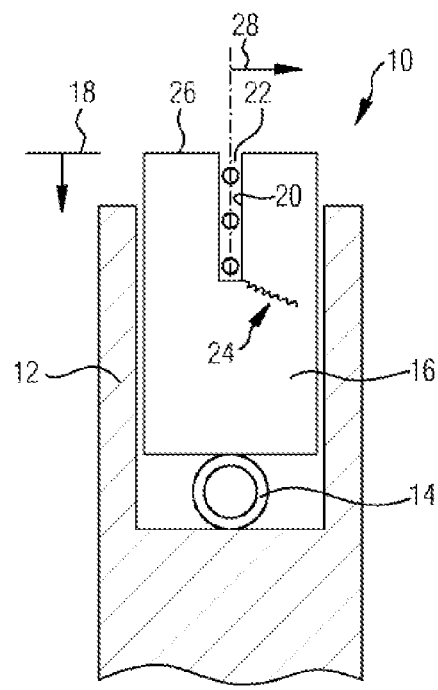
FIG. 1 a schematic end view of a conventional sealing strip system with a sensor groove extending in the direction of the axis of the expected wear, FIG. 2 a schematic end view of an exemplary embodiment of an inventive sealing strip system with a sealing strip according to an aspect of the invention with groove-shaped sensor channels incorporated in the sealing strip from the front side of the sealing strip and provided with hoses, FIG. 3 a schematic end view of part of an exemplary embodiment of an inventive sealing strip system with groove-shaped sensor channels incorporated in the sealing strip from the rear side of the sealing strip and a recess provided in the sealing strip and serving for stroke limitation, FIG. 4 an enlarged schematic partial illustration of an exemplary embodiment of an inventive sealing strip system with groove-shaped sensor channels incorporated in the sealing strip from the rear side of the sealing strip, FIG. 5 an enlarged schematic partial illustration of a further exemplary embodiment of an inventive sealing strip system, which is comparable to the embodiment according to FIG. 4, with groove-shaped sensor channels incorporated in the sealing strip from the rear side of the sealing strip and hoses associated with these sensor channels, FIG. 6 a schematic guide-side rear view of an exemplary embodiment of an inventive sealing strip system without monitoring of the format limiter region on the guide side, FIG. 7 a schematic guide-side rear view of an exemplary embodiment of an inventive sealing strip system with monitoring of the format limiter region on the guide side, and FIG. 8 a schematic partial illustration of an exemplary spatially optimized course of the sensor channels in the sealing strip according to FIG. 7 as an alternative to the course of the sensor channels of the sealing strip system according to FIG. 7.

FIG. 1 shows, in a schematic end view, a conventional sealing strip system 10 with a sealing strip 16, arranged in a sealing strip holder 12, which can be acted upon by a pressure hose 14 and has a sensor groove 20 extending in the direction of the axis 18 of the expected wear for receiving a sensor system 22 serving to monitor wear and comprising at least one sensor.

As already mentioned at the outset, in a conventional sealing strip system of this type, as a result of the sensor groove 20 extending in the direction of the axis of the expected wear 18, there is a risk of fracture, amongst other things, for example in the region 24, due to the friction force 28 exerted on the sealing face of the sealing strip 16 by the respective roll.

In contrast, FIGS. 2 to 8 show exemplary embodiments of an inventive sealing strip system.

The different embodiments of the inventive sealing strip system 30 also each again comprise a sealing strip 32, which is arranged in a sealing strip holder (not shown) and can be acted upon by a pressure hose (not shown) or the like for sealing a suction zone of a suctioned roll of a machine for producing and/or processing a web of fibrous material, wherein the sealing strip 32 has a respective wear volume which can be gradually abraded by tribological contact with the roll.

The different embodiments of the inventive sealing strip system 30 moreover each comprise a sensor system 34 for detecting a respective state of wear of the sealing strip 32 and an evaluation unit 36 which can be connected to the sensor system 34. In this case, the sensor system 34 is in each case embedded in at least one sensor channel 40 extending within the sealing strip 32 in the longitudinal direction L thereof in the region of the wear volume over at least substantially the entire length of the sealing face 38 of the sealing strip 32 and can be connected to the evaluation unit 36 and/or a unit for supplying the sensor system 34 with a medium serving to generate information via at least one connection 42 leading out of the sealing strip 32 via the lower region of the sealing strip 32 provided on the side of the wear volume which faces away from the sealing face 38.

In this case, a respective sensor channel 40 can be incorporated in the sealing strip 32 by straight milling, in particular in the form of a groove.

The sensor system 34 can be fixed in the at least one sensor channel 40 by an adhesive and/or with form fit, force fit and/or material fit.

At least one sensor channel 40 can be incorporated in the sealing strip 32 from an end side of the sealing strip 32.

Figure 2:
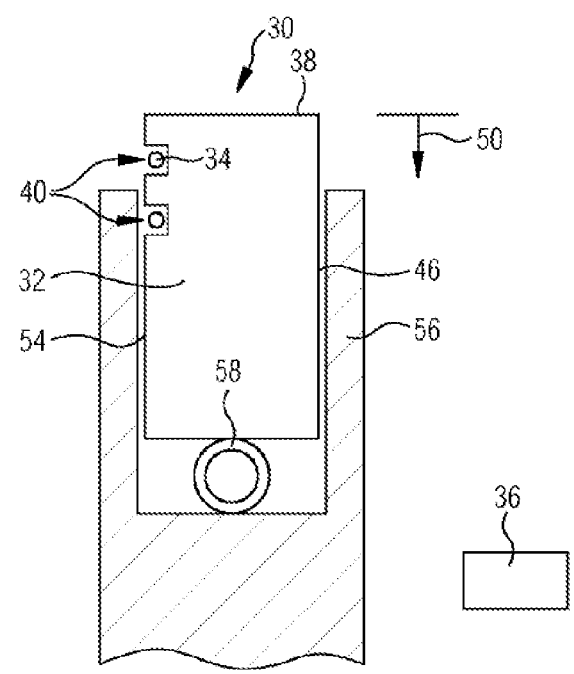

However, such embodiments of the inventive sealing strip system 30 are also possible in which at least one sensor channel is incorporated in the sealing strip 32 from a longitudinal side, in particular from the back or rear side (c.f. FIGS. 3 to 7), which faces away from the suction zone, or front side (c.f. FIG. 2) of the sealing strip 32.

At least one sensor channel 40 can be arranged at the level of a predetermined wear point in the sealing strip 32.

A respective sealing strip 32 can be provided, in particular, with at least two sensor channels 40 arranged at different spacings from the sealing face 38 and each extending within the sealing strip 32 in the longitudinal direction L thereof in the region of the wear volume over at least substantially the entire length of the sealing face 38 of the sealing strip 32.

The respective sensor system 34 can comprise, for example, at least one wire, conductor and/or light guide extending in a respective sensor channel 40. In this case, the medium serving to generate information can comprise, in particular, power and/or light.

The medium serving to obtain information can, however, also comprise a gas and/or fluid guided in a respective sensor channel 40 or a tube, hose 44 (c.f. FIGS. 2, 3 and 5) or the like arranged therein.

The at least one connection 42 of the sensor system 34 to the evaluation unit 36 and/or the unit for supplying the sensor system 34 with a medium serving to generate information can, in particular, lead out of the sealing strip 32 via the lower region of the sealing strip 32 provided on the side of the wear volume which faces away from the sealing face 38 (c.f. in particular FIGS. 6 and 7).

In this case, the at least one connection 42 of the sensor system 34 to the evaluation unit 36 and/or the unit for supplying the sensor system 34 with a medium serving to generate information can lead out of the sealing strip 32 from a longitudinal side, for example, in particular from the back or rear side 46 of the sealing strip 32 which faces away from the suction zone, via the lower region of the sealing strip 32 provided on the side of the wear volume which faces away from the sealing face 38 (again, c.f. in particular FIGS. 6 and 7).

The respective connection 42 of the sensor system 34 to the evaluation unit 36 and/or the unit for supplying the sensor system 34 with a medium serving to generate information can comprise, for example, at least one gas, fluid, power and/or light line and/or, for example, at least one gas, fluid, power and/or light connection.

As can again be seen in particular in FIGS. 6 and 7, the respective connection 42 of the sensor system 34 to the evaluation unit 36 and/or the unit for supplying the sensor system 34 with a medium serving to generate information can comprise at least one kink protection 48 such as, for example, at least one elbow or the like.

As can again be seen in particular in FIGS. 6 and 7, a respective connection 42 of the sensor system 34 to the evaluation unit 36 and/or the unit for supplying the sensor system 34 with a medium serving to generate information leads out of the sealing strip 32 in a region which, as seen in the direction of the axis 50 of the expected wear, has a predetermined minimum safety spacing d from the maximally worn sealing face 38' of the sealing strip 32 and/or, as seen in the longitudinal direction L of the sealing strip 32 from a respective end side 52 of the sealing strip 32, has a spacing X which depends on the adjustment path of a format limiter sealing the suction zone in the region of this end side 52.

Such a spacing X is normally more than 5 cm, in particular more than 10 cm, preferably 20 cm or more.

FIG. 2 shows, in a schematic end view, an exemplary embodiment of an inventive sealing strip system 30 having two groove-shaped sensor channels 40 incorporated in the sealing strip 32 from the front side 54 of the sealing strip 32 and receiving the sensor system 34. In this case, in a purely exemplary schematic illustration, a sealing strip holder 56 receiving the sealing strip 32 and a pressure hose 58 provided for acting on the sealing strip 32 can also be seen in this illustration. In a modification of the sealing strip 32 shown in FIG. 2, it can also be provided that the groove-shaped sensor channels 40 are constructed so that at least one sensor channel 40 receives only part of the sensor system 34, whilst part of the sensor system 34 projects out of the sealing strip 32. A sensor channel 40 which is configured in this way can be advantageous since only a relatively small recess has to be created in the sealing strip 32 for this purpose. In particular, if the sensor system 40 is relatively large, this can be advantageous for the stability of the strip 32. In an extreme case, it can even be envisaged that at least one sensor system 34 is provided in the form of a hose, which is provided externally on the sealing strip, without a groove.

FIG. 3 shows, in a schematic end view, part of an exemplary embodiment of an inventive sealing strip system 30 having two groove-shaped sensor channels 40, which are incorporated in the sealing strip 32 from the rear side 46 of the sealing strip 32 and in which a hose associated with the sensor system 34 is incorporated in each case, which hose is, for example, glued in the respective sensor channel 40 in each case. Moreover, the sealing strip 32 is provided with a recess 60 serving for stroke limitation. In this case, the recess 60 can have a predeterminable spacing 62 from the hose 44 adjacent to the sealing face 38, which is, for example, at least 5 mm in the present case. However, another minimum value can essentially also be selected for the spacing 62.

FIG. 4 shows, in an enlarged partial illustration, an exemplary embodiment of an inventive sealing strip system 30 having two groove-shaped sensor channels 40, which are incorporated in the sealing strip 32 from the rear side 46 of the sealing strip 32 and, as seen in the direction of the axis 50 of the expected wear, are arranged at different spacings $d_1$ and $d_2$ from the sealing face 38. In this case, the spacing $d_1$ in the present case is in the range of 3 mm, for example, and the spacing $d_2$ is in the range of 5.6 mm, for example. In the present case, the width b of the respective sensor channel 40 in the direction of the axis 50 of the expected wear is, for example, in the range of 1.6 mm in each case. However, the given values are purely exemplary. The relevant measurements can therefore also deviate from the given values.

FIG. 5 shows a further enlarged schematic partial illustration of an exemplary embodiment of an inventive sealing strip system 30, which is comparable to the embodiment according to FIG. 4, having groove-shaped sensor channels 40 incorporated in the sealing strip 32 from the rear side 46 of the sealing strip 32 and hoses 44 of the sensor system 34 which are associated with these sensor channels. In this case, the sensor channels 40 are, for example, incorporated in the sealing strip 32, and the hoses 4 incorporated therein are, for example, selected, such that the hose 44 inserted into the sensor channel 40 situated closest to the sealing face 38 responds, for example, to wear in the range of 40% of the maximum wear and, for example, when the wear is in the range of 3.2 mm, whilst the hose 44 inserted into the sensor system channel 40 having the largest spacing from the sealing face 38 responds, for example, in the range of 15% above the maximally worn sealing face or when the wear is in the range of 6.8 mm. However, the given ranges and values are also purely exemplary in the present case. Ranges and values which deviate therefrom are essentially also conceivable.

FIG. 6 shows, in a schematic guide-side rear view, an exemplary embodiment of an inventive sealing strip system 30 without monitoring of the format limiter region on the guide side, whilst, in FIG. 7, a corresponding view of an inventive sealing strip system 30 with monitoring of the format limiter region on the guide side is shown. In this case, the connection 42 of the sensor system 34 to the evaluation unit 36 and/or the unit for supplying the sensor system 34 with a medium serving to generate information leads out of the sealing strip 32 in each case in a region which, as seen in the direction of the axis 50 of the expected wear, has a predetermined minimum safety spacing d from the maximally worn sealing face 38' of the sealing strip 32, and/or as seen in the longitudinal direction L of the sealing strip 32 from a respective end side 52 of the sealing strip 32, has a spacing X which depends on the adjustment path of a format limiter sealing the suction zone in the region of this end side 52.

In this case, in the embodiment according to FIG. 6 without the monitoring of the format limiter region on the guide side, the spacing X between the end side 52 and the region in which the connection 42 leads out of the sealing strip 32 is greater than in the embodiment according to FIG. 7 with the monitoring of the format limiter region on the guide side. The minimum safety spacing d between the maximally worn sealing face 38' and the region in which the connection 42 leads out of the sealing strip 32 is, for example, at least 8 mm in both cases. However, another minimum value is essentially also conceivable. The minimum radius of curvature $R_{min}$ of the sensor channels 40 provided, for example, as hose channels in the embodiments according to FIGS. 6 and 7 is, for example, in the range of 6 mm, wherein other values are again also essentially conceivable here. The maximum wear is, for example, 8 mm. However, other values are again also conceivable here.

Whilst, in the embodiment according to FIG. 7, the sensor channels 40 are bent twice in the downward direction in the region of the end side 52 for crossing over into the exit region, FIG. 8 shows, in a schematic partial illustration, an exemplary spatially optimized course of the sensor channels 40 in the sealing strip 32 according to FIG. 7 as an alternative to the course of the sensor channels 40 of the sealing strip system 30 according to FIG. 7, in which the sensor channels 40 are firstly bent downwards in the region of the end side 52 and are bent upwards again after a section extending in the longitudinal direction L of the sealing trip 32.

LIST OF REFERENCE SIGNS

1 Conventional sealing strip system
2 Sealing strip holder
14 Pressure hose
16 Sealing strip
18 Axis of the expected wear
20 Sensor groove
22 Sensor system
24 Region
26 Sealing face
28 Friction force
30 Inventive sealing strip system
32 Sealing strip
34 Sensor system
36 Evaluation unit
38 Sealing face
38' Maximally worn sealing face
40 Sensor channel
42 Connection
44 Hose
46 Rear side
48 Kink protection
50 Axis of the expected wear
52 End side
54 Front side
56 Sealing strip holder
58 Pressure hose
60 Recess
62 Spacing
64 Maximum wear
L Longitudinal direction of the sealing strip
X Spacing depending on the adjustment path of a format limiter
$R_{min}$ Minimum radius of curvature
b Width of a respective sensor channel
d Minimum safety spacing from the maximally worn sealing face
$d_1$ Spacing from the sealing face
$d_2$ Spacing from the sealing face

The invention claimed is:

1. A sealing strip system for sealing a suction zone of a suctioned roll of a machine for producing and/or processing a web of fibrous material, the sealing strip system comprising:
    the sealing strip having a sealing face and a wear volume, which is gradually abraded by tribological contact with the roll during use;
    the sealing strip extending along a longitudinal direction and having a front longitudinal side facing toward the suction zone and a rear longitudinal side facing away from the suction zone;
    one of said front or rear longitudinal sides of the sealing strip having at least one sensor channel formed therein extending over substantially an entire length of the sealing strip;
    a sensor system for detecting a state of wear of said sealing strip;
    an evaluation unit to be connected to said sensor system;
    said sensor system being embedded in said at least one sensor channel formed in said front or rear longitudinal side of the sealing strip and extending within said sensor channel in a longitudinal direction thereof in a region of said wear volume over substantially the entire length of said sealing face of said sealing strip;
    at least one connection for connecting said sensor system to at least one of said evaluation unit or a unit for supplying the sensor system with a medium serving to generate information;
    said at least one connection of said sensor system leading away from said front or rear longitudinal side of said sealing strip at a lower region of said sealing strip distal from said sealing face.

2. The sealing strip system according to claim 1, wherein said at least one connection leads out from the front longitudinal side of said sealing strip that faces the suction zone of the suctioned roll.

3. The sealing strip system according to claim 1, wherein said at least one sensor channel is a straight-milled groove formed in said front or rear longitudinal side of said sealing strip.

4. The sealing strip system according to claim 1, wherein said sensor system is fixed in said at least one sensor channel by at least one of an adhesive, a form fit, a force fit, or a material fit.

5. The sealing strip system according to claim 1, wherein said at least one sensor channel is arranged at a level of a predetermined wear point in said sealing strip.

6. The sealing strip system according to claim 1, wherein said at least one sensor channel is one of at least two sensor channels arranged at different spacings from said sealing face and each extending within said sealing strip in the longitudinal direction thereof in the region of the wear volume over an entire length or over substantially the entire length of said sealing face of said sealing strip.

7. The sealing strip system according to claim 1, wherein said sensor system comprises at least one element selected from the group consisting of a wire, a conductor, and a light guide extending in a respective said sensor channel.

8. The sealing strip system according to claim 1, wherein the medium serving to generate information comprises a fluid in liquid and/or gaseous form guided in a respective said sensor channel or in a tube or hose arranged in said sensor channel.

9. The sealing strip system according to claim 1, wherein said at least one connection of said sensor system to at least one of said evaluation unit or said unit for supplying said sensor system with a medium serving to generate information comprises at least one line selected from the group consisting of a gas line, a fluid line, a power line, and a light line and a connection selected from the group consisting of a connection for gas, fluid, power, and light.

10. The sealing strip system according to claim 1, wherein said at least one connection comprises a kink protection.

11. The sealing strip system according to claim 10, wherein said kink protection is a pipe elbow.

12. The sealing strip system according to claim 1, wherein said at least one connection of said sensor system to at least one of said evaluation unit or said unit for supplying said sensor system with the medium serving to generate information leads out of said sealing strip in a region which has a predetermined minimum safety spacing from a maximally worn sealing face of said sealing strip or a spacing which depends on an adjustment path of a format limiter sealing the suction zone at a given end side of said sealing strip.

13. The sealing strip system according to claim 12, wherein said at least one connection leads out of said sealing strip in a region which has the predetermined minimum safety spacing from the maximally worn sealing face of said sealing strip, and also from the given end side of said sealing strip, has a spacing X which depends on the adjustment path of the format limiter sealing the suction zone in the region of the given end side, wherein the spacing X is at least 5 cm.

14. The sealing strip system according to claim 1, wherein said sealing strip is formed with at least two sensor channels, each incorporated in said sealing strip from a longitudinal side, and wherein each of said at least two sensor channels is arranged at a level of a predetermined wear point in said sealing strip.

15. The sealing strip system according to claim 14, wherein said at least two sensor channels are formed in the same longitudinal side of said sealing strip.

16. A sealing strip configured for a sealing strip system according to claim 1.

* * * * *